(12) United States Patent
Dai

(10) Patent No.: US 7,723,880 B2
(45) Date of Patent: May 25, 2010

(54) HAND CRANK GENERATOR

(75) Inventor: Jen Hao Dai, Jhongli (TW)

(73) Assignee: Daniel Tsai, LaneLisle, IL (US)

( * ) Notice: Subject to any disclaimer, the term of this patent is extended or adjusted under 35 U.S.C. 154(b) by 289 days.

(21) Appl. No.: 11/968,639

(22) Filed: Jan. 2, 2008

(65) Prior Publication Data

US 2008/0180001 A1  Jul. 31, 2008

(30) Foreign Application Priority Data

Jan. 26, 2007  (TW) .............................. 96201562 U

(51) Int. Cl.
*H02K 7/10* (2006.01)
*H02K 7/116* (2006.01)

(52) U.S. Cl. .................. 310/75 R; 310/41; 310/74; 310/78; 310/83; 290/1 R

(58) Field of Classification Search ............... 310/41; 290/1 R
See application file for complete search history.

(56) References Cited

U.S. PATENT DOCUMENTS

| 661,464 | A | * | 11/1900 | Borger et al. ............... 318/136 |
|---|---|---|---|---|
| 1,855,281 | A | * | 4/1932 | Chilton ..................... 290/38 B |
| 3,342,998 | A | * | 9/1967 | Anderson ................... 290/1 R |
| 4,360,860 | A | * | 11/1982 | Johnson et al. ............. 362/192 |
| 4,701,835 | A | * | 10/1987 | Campagnuolo et al. ..... 362/192 |
| 4,703,188 | A | * | 10/1987 | Gottfried .................. 290/38 B |
| 4,746,806 | A | * | 5/1988 | Campagnuolo et al. ..... 290/1 R |
| 5,998,975 | A | * | 12/1999 | Tada et al. ..................... 322/7 |
| 6,034,492 | A | * | 3/2000 | Saito et al. .................. 318/141 |
| 6,690,141 | B1 | * | 2/2004 | Yu ............................. 320/107 |
| 6,959,999 | B2 | * | 11/2005 | Lee ............................ 362/192 |
| 7,077,540 | B2 | * | 7/2006 | Yen ............................ 362/183 |
| 7,222,984 | B2 | * | 5/2007 | Lee ............................ 362/192 |
| 7,608,933 | B2 | * | 10/2009 | Yang .......................... 290/1 C |

* cited by examiner

*Primary Examiner*—Burton Mullins
(74) *Attorney, Agent, or Firm*—Chun-Ming Shih

(57) ABSTRACT

A hand crank generator includes a crank, a gear transmission, and a generation motor driven by the gear transmission. The crank and the gear transmission are coupled to each other. A clutch gear is coupled between the crank and the gear transmission. The crank is manually driven to further drive the gear transmission, and the generation motor is driven to generate electric current through the clutch gear. When the cranking stops, the clutch gear disengages from a motor gear disposed on the generation motor. A weighted wheel continues to revolve under inertia for a while to drive the generation motor to keep on generating electric current, so that the purpose of saving manual efforts can be achieved.

12 Claims, 6 Drawing Sheets

HAND CRANK GENERATOR

BACKGROUND OF THE INVENTION (a) Field of the Invention

The present invention is related to a hand crank generator, and more particularly, to one that is applied in small sized electric appliances.

(b) Description of the Prior Art

Small size electric appliances, e.g., flashlights, battery chargers, are indispensable in our daily life; however, so far all these small sized electric appliances must use batteries or connection to a power source to operate. Though those battery dependent products permit easy portability and convenient use, battery must be continuously replaced or recharged due to the limited storage capacity of the battery. As a result, these electric appliances are not necessarily always readily available; and that could be a problem particularly for those who spend much time on the road. To correct this problem, a hand crank generator is introduced into the market.

Conventional hand crank generator operates by cranking to drive gears to rotate, and those gears in turn directly drives the generator. Once the cranking stops, the generator also stops generating power. Accordingly, to generate more power, a great effort must be consumed to exchange for sufficient electric energy.

SUMMARY OF THE INVENTION

The primary purpose of the present invention is to provide a hand crank generator that is simple in construction and allows easy operation.

To achieve the purpose, a hand crank generator is essentially comprised of a crank, a gear transmission, and a generation motor driven by the gear transmission; the crank and the gear transmission are coupled to each other, and the gear transmission and the generation motor are coupled to each other with a clutch gear.

The crank is provided with an arm and a handle; and the handle is disposed to a terminal of the arm.

The clutch gear is connected to a deflection shaft, which in turn is connected to a second shaft disposed in the gear transmission through a connection plate; and both ends of the deflection shaft are located in a deflection groove.

A motor gear is fixed to a central shaft of the generation motor and the motor gear engages with the clutch gear.

A weighted wheel is further fixed to a terminal of the central shaft of the generation motor. With the inherited inertia provided by the weighted wheel, the generation motor is capable of continuous revolution for a while when the external force applied on the crank disappears.

The gear transmission includes a first transmission gear, a second double gear, a third double gear, and a fourth double gear; wherein the first transmission gear is fixed to the arm, and the first gear engages with a pinion in the second double gear; a gearwheel of the second double gear engages with a pinion in the third double gear; a gearwheel of the third double gear engages with a pinion in the fourth double gear; and the gearwheel of the fourth double gear engage with the clutch gear. The gear transmission adopts a three-stage acceleration design to increase output revolution speed.

Alternatively, the gear transmission may be comprised of a first revolving gear and a second double gear; wherein the first revolving gear is connected to a shaft and the second double gear is connected to a second shaft; the first revolving gear is fixed to the crank; the first revolving gear engages with a pinion in the second double gear; and a gearwheel of the second double gear engages with the clutch gear.

In the present invention, the crank is driven manually to further drive the gear transmission and then the generation motor revolves as driven by the clutch gear to generate electric current. When the manual cranking stops, the clutch gear is disengaged from the motor gear on the generation motor; however, given with the inertia provided by the weight wheel, the motor gear continues to revolve for a while to drive the generation motor to keep generating electric current. Accordingly, a user may save lots of efforts. Furthermore, the present invention may be connected to an energy accumulator like a battery to become another product with different application when the present invention is connected to an electricity input end of a light emitting object or other electric appliance through the energy accumulator like a battery.

DETAILED DESCRIPTION OF THE PREFERRED EMBODIMENTS

Figure 1:
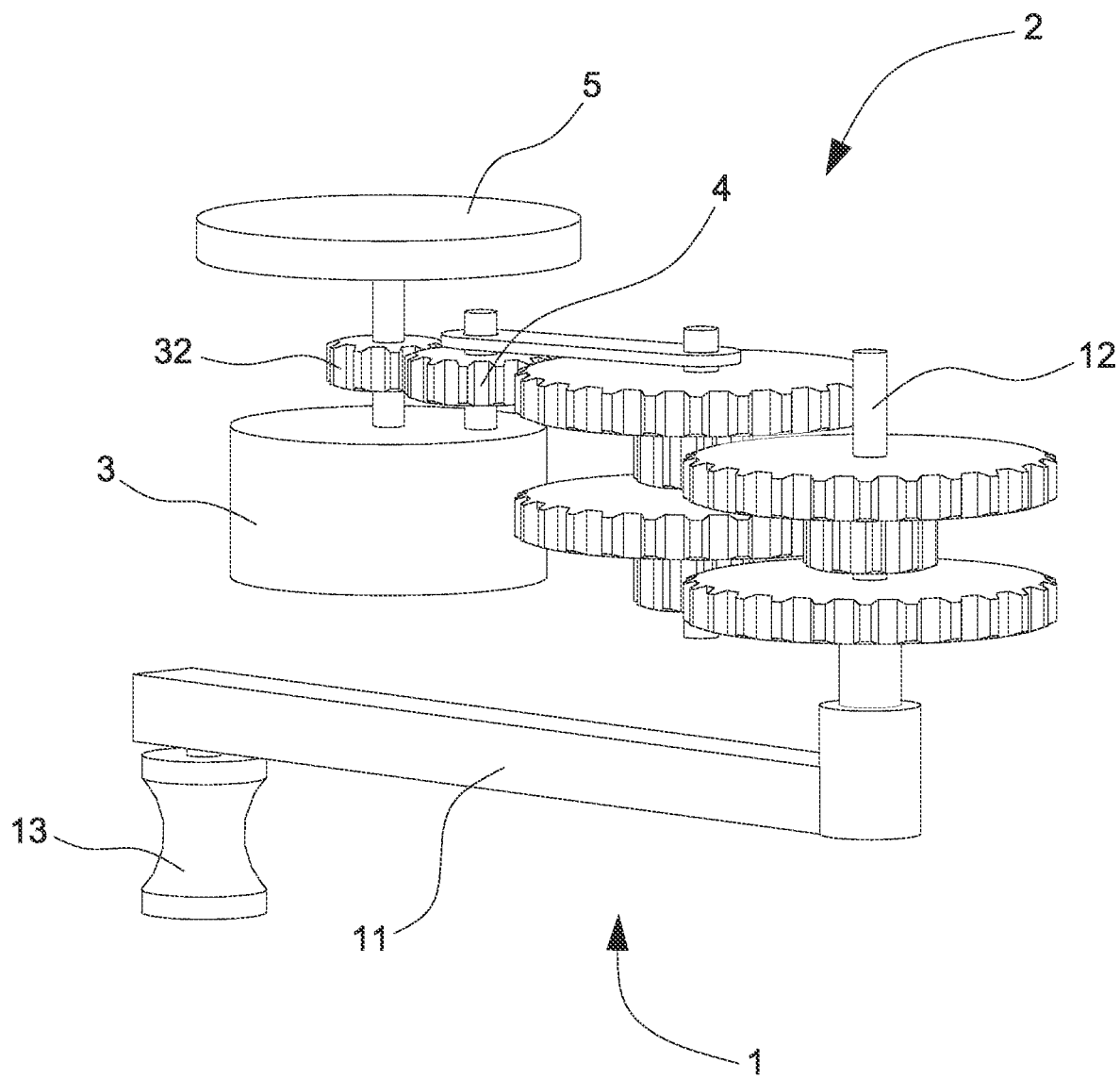
FIG. 1 is a perspective view of a preferred embodiment of the present invention.
Figure 2:
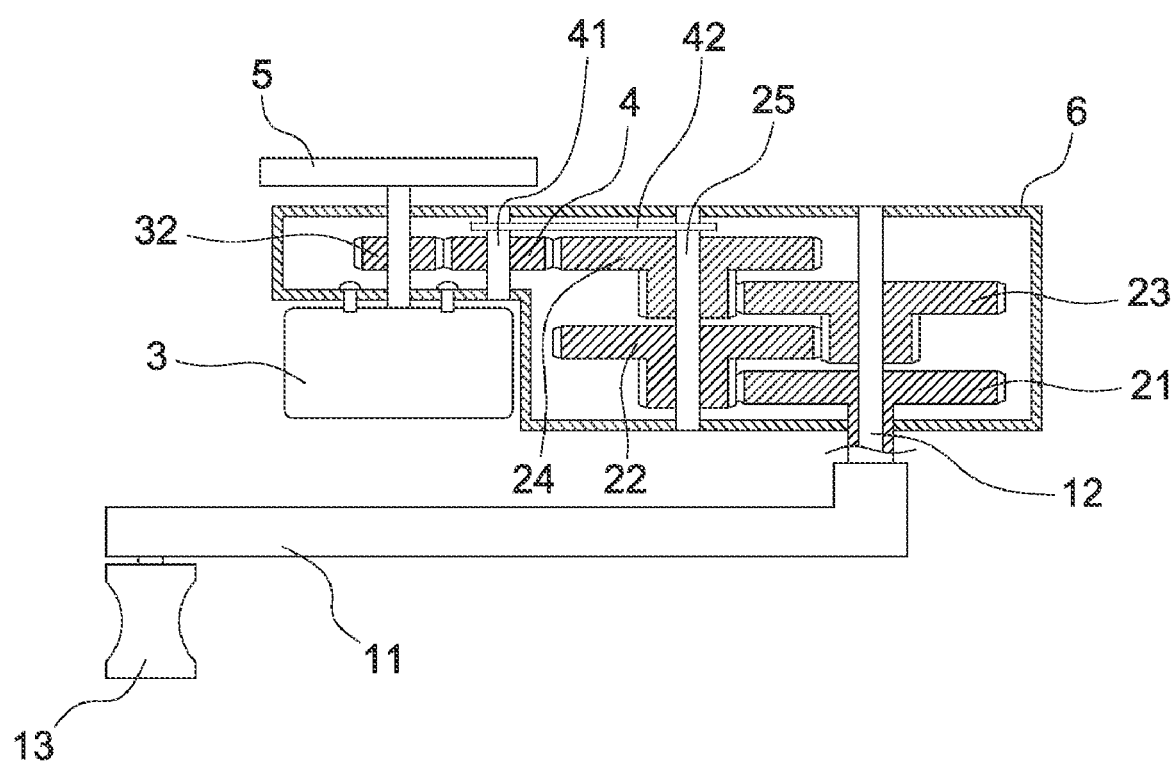
FIG. 2 is a schematic view showing an internal construction of the preferred embodiment of the present invention.

Referring to FIGS. 1 and 2 for a preferred embodiment of the present invention, a hand crank generator of the present invention is comprised of a crank 1, a gear transmission 2, a generation motor 3, a clutch gear 4, and a weighted wheel 5. Wherein, the gear transmission 2 is mounted in a box 6; the crank 1 is connected to an input end of the gear transmission 2 to drive the gear transmission 2; the clutch gear 4 is located at an output end of the gear transmission 2 and engages with a motor gear 32 disposed on a central shaft 31 of the generation motor 3 to drive the generator for generating electric current; and the crank 1 is provided with an arm 11 and a handle 13 with the handle mounted to one end of the arm 11.

The gear transmission 2 of the preferred embodiment is essentially comprised of a first transmission gear 21, a second double gear 22, a third double gear 23, and a fourth double gear 24. Wherein, the first transmission gear 21 and the third double gear 23 are connected to a shaft 12; the second double gear 22 and the fourth double gear 24 are connected to a second shaft 25; and both of the shaft 12 and the second shaft 25 are secured in place by multiple locating holes disposed on the box 6. The first transmission gear 21 is fixed to the crank 1 for the crank 1 to directly drive the first transmission gear 21 to revolve; the first transmission gear 21 engages with a pinion in the second double gear 22; a gearwheel of the second double gear 22 engages with a pinion in the third double gear 23; a gearwheel of the third double gear 23 engages with a pinion in the fourth double gear 24. The input revolution speed from the crank 1 is increased through the series transmission executed by the gear transmission 2.

Finally, a gearwheel of the fourth double gear 24 engages with the clutch gear 4 to further increase the revolution speed. Accordingly, the generation motor 3 is driven to produce higher revolution speed for upgrading generation efficiency.

The installation of the clutch gear 4 constitutes the most important feature of the present invention. When an external force is applied to drive the crank 1 to further drive the gear transmission 2 to operate, the clutch gear engages with a motor gear 32 disposed on the generation motor 3 to drive the generator to generate power; when the external force applied on the crank 1 disappears, the clutch gear 4 disengages from the motor gear 32, but the central shaft where the generation motor is located continues to revolve for power generation for a while due to the inertia from the weighted wheel even when the crank 1 stops. Therefore the generation motor 3 continues to operate for a while when the crank 1 stops operating.

Figure 3:
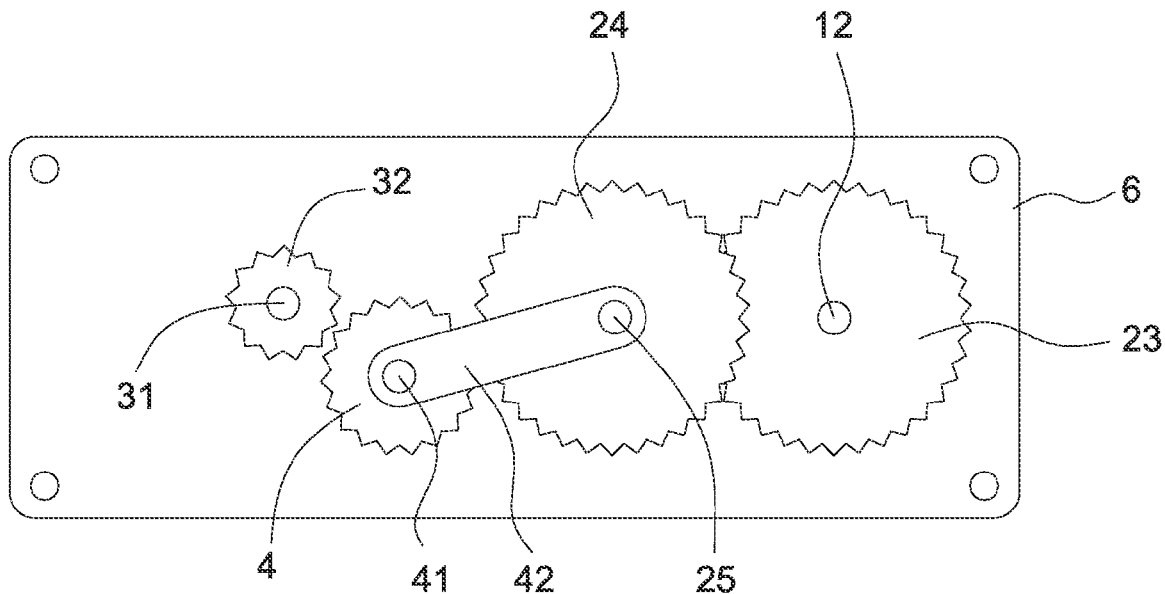
FIG. 3 is a schematic view showing a clutch gear and a motor gear in the preferred embodiment of the present invention.
Figure 4:
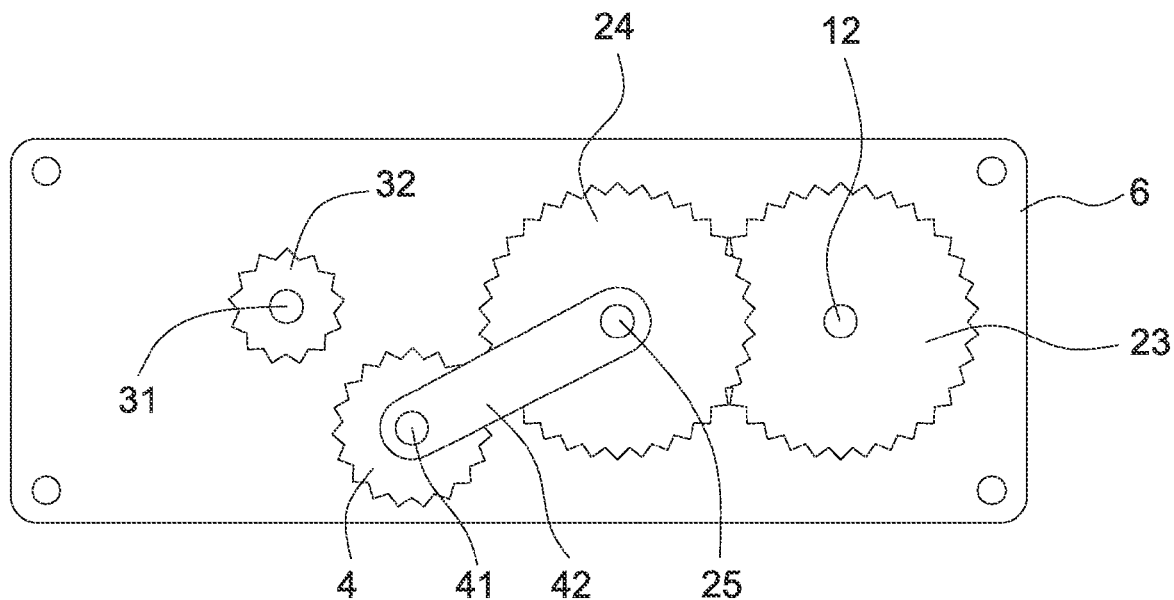
FIG. 4 is a schematic view showing a status wherein the clutch gear and the motor gear are disengaged from each other in the preferred embodiment of the present invention.
Figure 5:
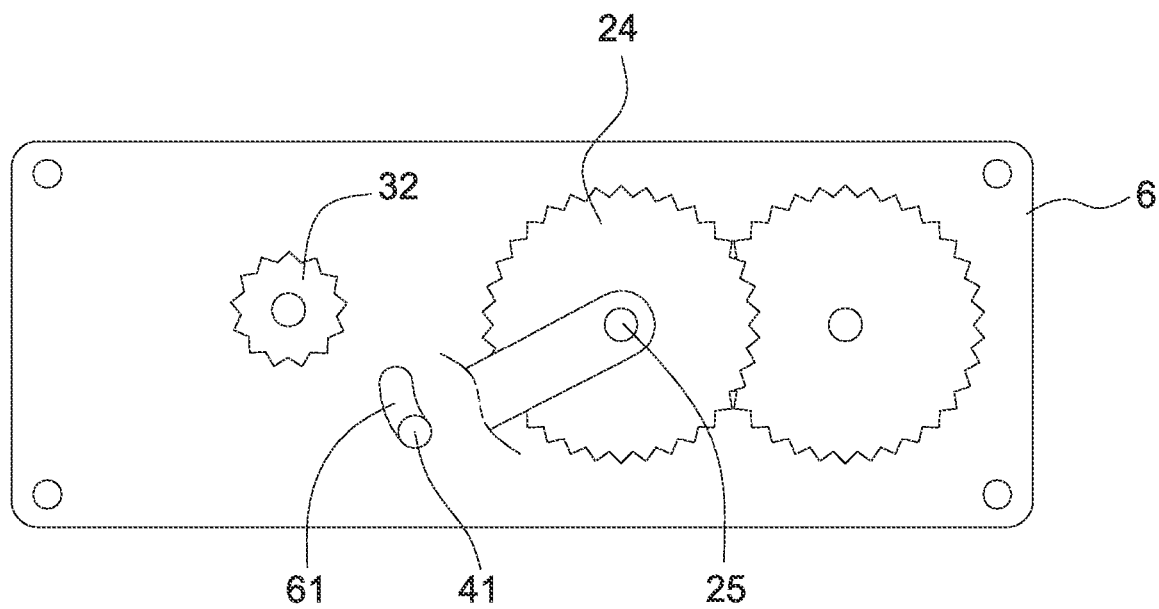
FIG. 5 is a schematic view showing a deflection groove provided to the clutch gear in the preferred embodiment of the present invention.

Now referring to FIGS. 3, 4, and 5, the clutch gear 4 connected to a deflection shaft 41, which is connected to the second shaft 25 in the gear transmission 2 through a connection plate while the clutch gear 4 engages with the gearwheel of the fourth double gear 24. Furthermore, the connection plate 42 holds the clutch gear 4 firmly in position to prevent its axial angle from deflection. To limit the deflection angle of the clutch gear 4, both ends of the deflection shaft 41 are disposed in a deflection groove 61 in the present invention. When the crank 1 drives the gear transmission, the fourth double gear 24 rotates clockwise for its gearwheel to drive the clutch gear to revolve. Since the clutch gear 4 is situated in a non-fixation status, the fourth double gear 24 will drive the clutch gear to deflect clockwise for the clutch gear 4 to engage with the motor gear 32 on the generation motor 3 to drive the generation motor 3 to revolve. When an external force applied on the crank 1 disappears, the fourth double gear 24 stops rotating and a force acting upward as produced by the fourth double gear 24 upon the clutch gear 4 also disappears; but the motor gear 32 under action of inertia continues to rotate clockwise for a while. As the motor gear 32 continues to rotate, the clutch gear 4 is pushed to downward deflect to cause the clutch gear 4 to disengage from the motor gear 32. As a result, the motor gear 32 idles to drive the central shaft 31 to continue rotation for a given time before the central shaft 31 stops rotating. Before the central shaft 31 stops rotating, the generation motor 3 keeps operating.

A weighted wheel 5 is fixed to a terminal of the central shaft 31 of the generation motor 3 to increase inertia rotation for the generation motor 3. The weight wheel 5 rotates at the same time when the crank 1 drives the generation motor 3 to operate. Whereas the weight wheel 5 is given with a relatively greater mass, it produces greater inertia. Therefore, once the central shaft 31 idles, it continues to rotate for a longer time as driven by the weighted wheel 5 to provide better generation capability.

Figure 6:
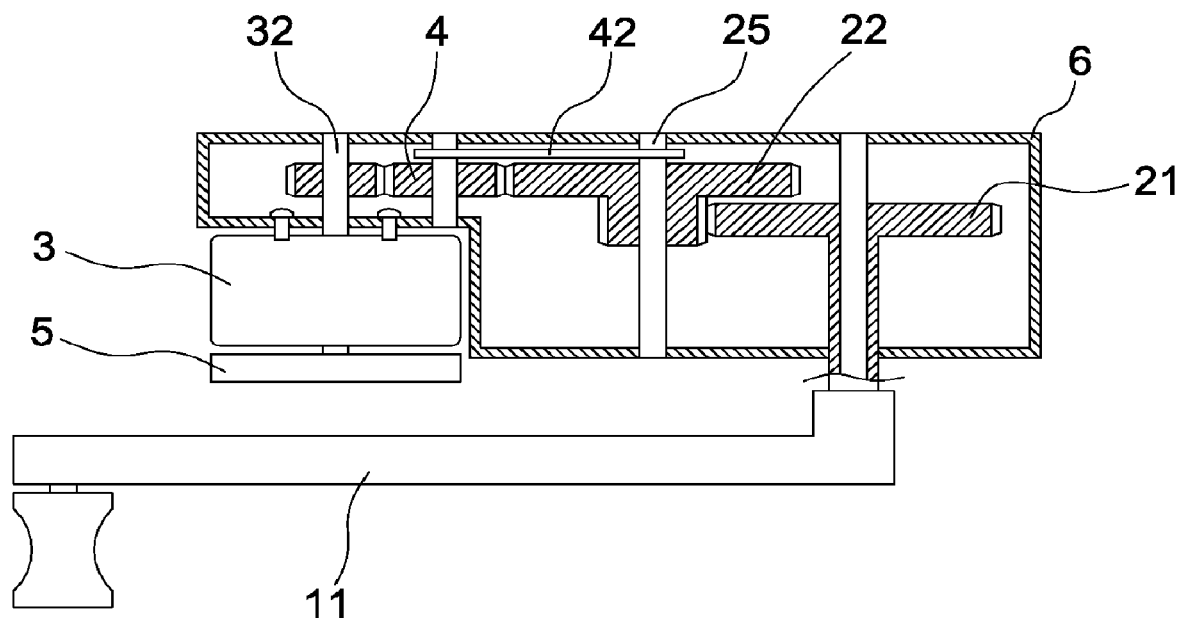
FIG. 6 is a schematic view showing another preferred embodiment of the present invention.

In another preferred embodiment of the present invention as illustrated in FIG. 6, a gear transmission 2 is comprised of a first transmission gear 21 and a second double gear 22. Wherein, the first transmission gear 21 connected to a shaft 12; the second double gear 22 connected to a second shaft 25; the first transmission gear is fixed to a crank 1; and the first transmission gear 21 engages with a pinion in the second double gear 22. The gear transmission in the preferred embodiment delivers only a regular acceleration. Furthermore, a weighted wheel 5 is disposed beneath a generation motor 3 in the preferred embodiment.

The quantity of gears to be provided in the present invention is not restricted and the quantity may be added or reduced as applicable. Furthermore, the connection plate 42 may be installed or removed depending on the construction of the gear transmission that is adapted to.

The invention claimed is:

1. A hand crank generator comprising a crank, a gear transmission, and a generation motor driven by the gear transmission; wherein the crank is coupled to the gear transmission and both of the gear transmission and the generation motor are coupled to each other with a clutch gear, and wherein the clutch gear engages with the last gear of the gear transmission, and to keep track of a deflection angle of the clutch gear, both ends of a deflection shaft of said clutch gear are disposed in a deflection groove, and a plate is used to connect both shafts of the clutch gear and the last gear of the gear transmission.

2. The hand crank generator as claimed in claim 1, wherein the crank is provided with an arm and a handle, and the handle is mounted to a terminal of the arm.

3. The hand crank generator as claimed in claim 1, wherein the generation motor is connected to a central shaft, a motor gear is fixed to the central shaft, and the motor gear engages with the clutch gear.

4. The hand crank generator as claimed in claim 3, wherein a weighted wheel is fixed to a terminal of the central shaft of the generation motor.

5. The hand crank generator as claimed in claim 1, wherein the gear transmission comprises a first transmission gear, a second double gear, a third double gear, and a fourth double gear, both of the first transmission gear and the third double gear are connected to a shaft, both of the second and the fourth double gears are connected to a second shaft, the first transmission gear is fixed to the crank, the first transmission gear engages with a pinion in the second double gear, a gearwheel of the second double gear engages with a pinion in the third double gear, a gearwheel of the third double gear engages with a pinion in the fourth double gear, and a gearwheel of the fourth double gear engages with the clutch gear.

6. The hand crank generator as claimed in claim 1, wherein the gear transmission comprises a plurality of gears, a first gear is connected to a shaft and is fixed to the crank and engages with a pinion of a second gear, the second gear engages the next gear to form a gear transmission, and a gearwheel of the last gear engages with a clutch gear.

7. A hand crank generator comprising a crank, a gear transmission, and a generation motor driven by the gear transmission; wherein the crank is coupled to the gear transmission and both of the gear transmission and the generation motor are coupled to each other with a clutch gear, and wherein the gear transmission comprises a first transmission gear, a second double gear, a third double gear, and a fourth double gear, both of the first transmission gear and the third double gear are connected to a shaft, both of the second and the fourth double gears are connected to a second shaft, the first transmission gear is fixed to the crank, the first transmission gear engages with a pinion in the second double gear, a gearwheel of the second double gear engages with a pinion in the third double gear, a gearwheel of the third double gear engages with a pinion in the fourth double gear, and a gearwheel of the fourth double gear engages with the clutch gear.

8. The hand crank generator as claimed in claim 7, wherein the crank is provided with an arm and a handle, and the handle is mounted to a terminal of the arm.

9. The hand crank generator as claim 7, wherein the clutch gear engages with the last gear of the gear transmission, and to keep track of a deflection angle of the clutch gear, both ends of a deflection shaft of said clutch gear are disposed in a deflection groove.

10. The hand crank generator as claimed in claim 7, wherein the generation motor is connected to a central shaft, a motor gear is fixed to the central shaft, and the motor gear engages with the clutch gear.

11. The hand crank generator as claimed in claim 10, wherein a weighted wheel is fixed to a terminal of the central shaft of the generation motor.

12. The hand crank generator as claimed in claim 7, wherein the gear transmission comprises a plurality of gears, a first gear is connected to a shaft and is fixed to the crank and engages with a pinion of a second gear, the second gear engages the next gear to form a gear transmission, and a gearwheel of the last gear engages with a clutch gear.

* * * * *